(12) United States Patent
Steelberg

(10) Patent No.: US 8,806,329 B2
(45) Date of Patent: Aug. 12, 2014

(54) APPARATUS, SYSTEM AND METHOD FOR SELECTING A MEDIA ENHANCEMENT

(76) Inventor: Ryan Steelberg, Irvine, CA (US)

( * ) Notice: Subject to any disclaimer, the term of this patent is extended or adjusted under 35 U.S.C. 154(b) by 0 days.

(21) Appl. No.: 13/185,773

(22) Filed: Jul. 19, 2011

(65) Prior Publication Data

US 2012/0150646 A1    Jun. 14, 2012

Related U.S. Application Data

(60) Provisional application No. 61/365,499, filed on Jul. 19, 2010.

(51) Int. Cl.
*G06F 17/00* (2006.01)

(52) U.S. Cl.
USPC .......................................................... 715/234

(58) Field of Classification Search
CPC ..................... G06F 17/30554; G06F 17/30873
USPC ......................................................... 715/234
See application file for complete search history.

(56) References Cited

U.S. PATENT DOCUMENTS

| | | | |
|---|---|---|---|
| 8,099,445 B1* | 1/2012 | Masinter et al. | 707/822 |
| 2003/0115143 A1* | 6/2003 | Kahn et al. | 705/51 |
| 2007/0282858 A1* | 12/2007 | Arner et al. | 707/10 |
| 2008/0102911 A1* | 5/2008 | Campbell et al. | 463/9 |
| 2008/0109477 A1* | 5/2008 | Lue | 707/102 |
| 2009/0138484 A1* | 5/2009 | Ramos et al. | 707/10 |
| 2010/0146442 A1* | 6/2010 | Nagasaka et al. | 715/810 |
| 2010/0281475 A1* | 11/2010 | Jain et al. | 717/172 |

OTHER PUBLICATIONS

Design and display of enhancing information in desktop information-rich virtual environments: challenges and techniques, Nicholas F. Polys, Springer-Verlag London limited, 2004, pp. 1-14.*

* cited by examiner

*Primary Examiner* — Doug Hutton, Jr.
*Assistant Examiner* — Andrew McIntosh
(74) *Attorney, Agent, or Firm* — Barnes & Thornburg, LLP; Thomas J. McWilliams; Edwards F. Bahm, Jr.

(57) ABSTRACT

The present invention is and includes a device, system and method for providing an image enhancement widget. The device, system and method include a javascript component that, upon execution, obtains at least one subject of primary content on a networked page, and at least one permission for enhancement of the primary content, ones of a plurality of content produced remotely from the javascript component and according to the javascript component, and an enhancement widget. The enhancement widget may be a flash widget.

8 Claims, 15 Drawing Sheets

APPARATUS, SYSTEM AND METHOD FOR SELECTING A MEDIA ENHANCEMENT

CROSS-REFERENCE TO RELATED APPLICATION

This application claims priority to U.S. Application Ser. No. 61/365,499 filed Jul. 19, 2010 entitled Apparatus, System and Method for Selecting a Media Enhancement. This application is also related to the application entitled Apparatus, System and Method for a Media Enhancement Widget, Application Ser. No. 61/312,458, filed on Mar. 10, 2010, and to the application entitled Apparatus, System and Method for a Media Enhancement Widget, Application Ser. No. 61/363,410, filed on Jul. 12, 2010 each of which applications is incorporated herein by reference as if set forth herein in its respective entirety.

BACKGROUND OF THE INVENTION

1. Field of the Invention

The present invention is directed to media enhancement and, more particularly, to an apparatus, system and method for a media enhancement widget.

2. Description of the Background

In typical current advertising embodiments, although sponsorship and promotional media is an 80 billion dollar industry in the United States, very little sponsorship and promotional advertising is engaged in "on-line," that is, in networked telecommunications environments such as Internet, extranet, intranet, satellite, wired, wireless, including ad-hoc wireless, and similar communication networks, which employ computers, personal digital assistants, conference phones, cellular telephones and the like. In fact, it its estimated that only 250 million dollars in on-line advertising using sponsorship and promotional material is made available in the United States, or 0.31% of the aforementioned 80 billion dollar industry.

Further, the inefficiencies of obtaining sponsorship and promotional spots in advertising drastically limit the universe of available sponsors and promoters, at least in that, if procurement of a brand can take several months, it stands to reason that advertisers will endeavor to obtain only those sponsors that the advertisers can be assured will have a positive public image and likeability over the course of many months. Needless to say, this drastically limits the universe of available sponsors. For example, it is estimated that, in the multi-billion dollar athletic sponsorship advertising industry, 95% of sponsorship dollars are spent hiring the top 5% of athletes to become sponsors. As such, very few sponsorships are made available by the prior art to less desirable athletes, although such athletes may be less desirable for any of a number of reasons, at least some of which reasons are unrelated to likeability or negative image. For example, a baseball player may be a perennial all-star, but may play in a "small market," and as such may not be deemed to fall within the top 5% of athlete-sponsors. Consequently, although the exemplary player may be very popular in certain areas or with certain demographics, in the prior art it is very unlikely this particular exemplary athlete will obtain much in the way of sponsorships.

Needless to say, the typically lengthy mechanism that precludes sponsorship from occurring on-line thus, as discussed above, drastically limits the available universe of sponsors. Further, such current mechanisms fail to take into account that certain sponsors may have a willingness to engage in certain sponsorships at certain times, with respect to certain products, in certain geographic locales, or in certain editorial or social contexts, or may be desired as sponsors at certain times, or only in certain geographic locales, or only with regard to certain products, or only in editorial or social contexts.

For example, in the sponsorship industry, it is well established that famous actors in the United States may market products internationally that they do not wish to lend sponsorship to in the United States. Additionally, because news with regard to United States athletes or actors, for example, may break more quickly in the United States, those same athletes or actors may experience a lengthened time of availability for desirable sponsorship in other countries. For example, a baseball player may come to be suspected of steroid use in the United States, thereby limiting his desirability as a sponsor for products in the United States, but may nonetheless continue to be popular in Japan until or if such steroid use is definitively proven. Thereby, an inability to efficiently provide for that baseball player to become a sponsor in Japan, where that baseball player may not normally allow for his likeness to be used in sponsorship, may seriously curtail sponsorship opportunities for that baseball player, as well as curtailing advertising possibilities for Japanese advertisers.

Thus, the need exists for an apparatus, system and method to allow for assessment of optimal sponsors for particular markets, in particular geographies, and in particular contexts, and that provides increased sponsorship and advertising opportunities.

SUMMARY OF THE INVENTION

The present invention is and includes a device, system and method for providing an image enhancement widget. The device, system and method include a javascript component that, upon execution, obtains at least one subject of primary content on a networked page, and at least one permission for enhancement of the primary content, ones of a plurality of content produced remotely from the javascript component and according to the javascript component, and an enhancement widget. The enhancement widget may be a flash widget, and may include ones of the plurality of content overlayed upon the primary content to provide a permitted enhancement of the primary content on the networked page. The enhancement widget may preferably provide the enhancement without obscuring at least other than the primary content of the networked page.

Thus, the present invention provides an apparatus, system and method to allow for assessment of optimal sponsors for particular markets, in particular geographies, and in particular contexts, and that provides increased sponsorship and advertising opportunities.

BRIEF DESCRIPTION OF THE DRAWINGS

Understanding of the disclosure will be facilitated by consideration of the following detailed description of the embodiments, taken in conjunction with the accompanying drawings, in which like numerals refer to like parts and in which:

FIG. 5 is an illustration of an enhancement widget in accordance with the present invention;

FIG. 11 is an illustration of an enhancement widget in accordance with the present invention;

DETAILED DESCRIPTION OF THE INVENTION

It is to be understood that the figures and descriptions of the present invention have been simplified to illustrate elements that are relevant for a clear understanding of the present invention, while eliminating, for the purposes of clarity, many other elements found in typical computing apparatuses, systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

Further, the elements and actions discussed herein may preferably be embodied in computing hardware, and may be operable over one or more computing networks, such as at one or more nodes of a computing network. Thus, aspects of the present invention may be associated with one or more computer storage mechanisms, and may be executed by one or more computing processors.

It is generally accepted that advertising and/or creative (hereinafter referred to as "ad," "creative," or "content") having the highest impact on the desired consumer base includes endorsements, sponsorships, or affiliations from those persons, entities, or the like from whom the targeted consumers seek guidance, or about whom the target customers seek news. As such, the desirability of providing content, such as an ad or content enhancement, associated with a particular talent may be based on the endorser's knowledge of particular goods or in a particular industry, the fame of the endorser, the respect typically accorded a particular endorser or sponsor, the use of the endorser in association with news, gossip, or the like, and other similar factors. As used herein, such content may be provided, for example, in association with content regarding a particular good or service, an actor, actress, an athlete, a famous person, a subject of an artistic, audio, visual, and/or audiovisual work, and/or an actual endorsement of the use of a product.

At present, there is a need for a platform or engine to allow for the querying, such as a searching and/or requesting, for content associated with a talent or brand, the return, responsive to a search and/or responsive to a recommendation, either manually or automatically, of content responsive to the query, and the fulfillment or delivery of the content, such as in association with other primary content. In a preferred embodiment, the delivery of the content may be in the form of, for example, a widget that serves to provide additional content that enhances the primary content.

Figure 1:
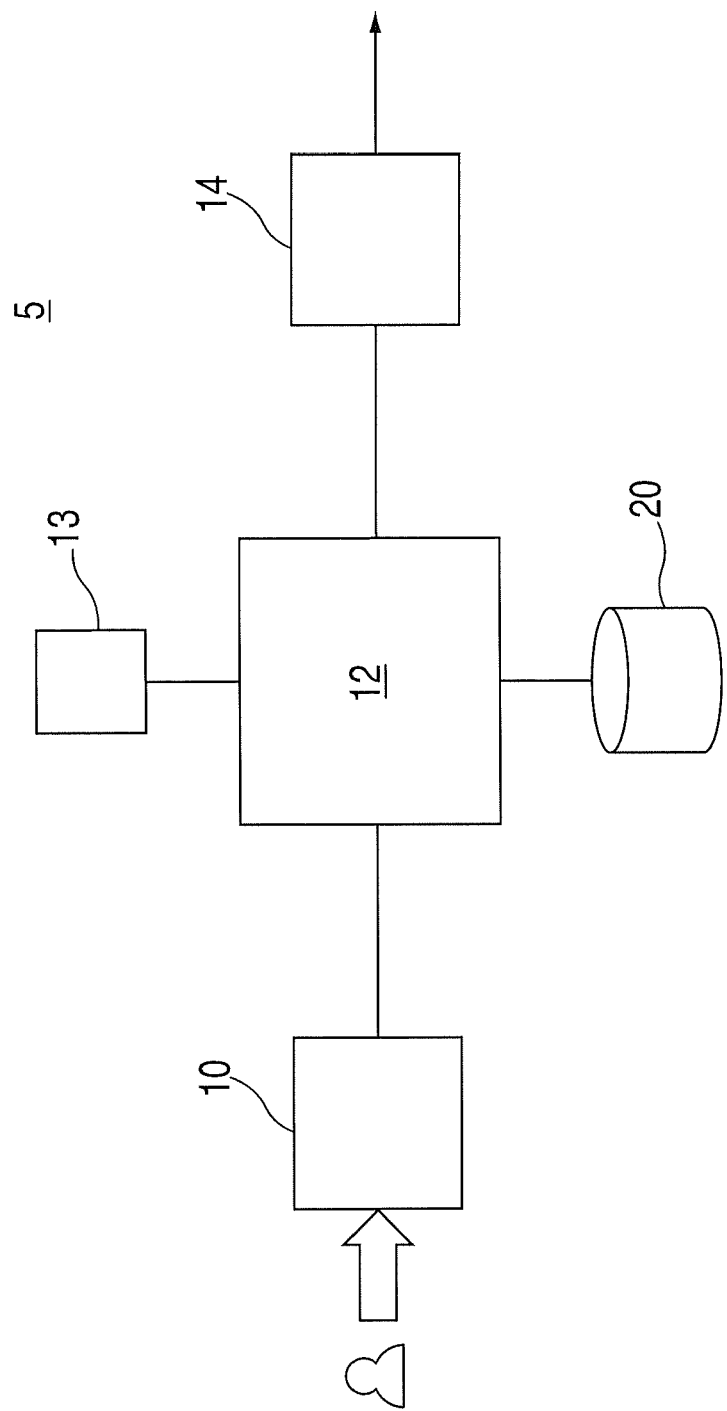
FIG. 1 is a block diagram that illustrates the system of engines in accordance with the present invention.

More specifically, and as illustrated in FIG. 1, the system 5 of the present invention may provide a query engine 10, whereby a user may inquire, such as by a search or request, for talent fitting certain categories, and/or for content associated with particular talent. The present invention may further provide a recommendation engine 12, which may be and/or include a server 13, such as a talent server, wherein the recommendation engine returns results responsive to the inquiry entered via query engine 10. Finally, a fulfillment engine 14 may enable the content for delivery, such as preparing the content returned by recommendation engine in a particular template, format, widget, or the like.

Thus, query engine 10 may be a search interface, a list interface, a series of selectable drop downs, a request for enhancement received from a third party site, or the like. Recommendation engine 12 may include, and/or have accessible thereto, a content vault 20, having resident therein a plurality of content categorically associated with, or associated on a one-to-one basis with, talent and brands. For example, content in the vault may include text, such as quotes, audio, video, pictures, highlights, or the like, and such content may have limited availability categorized by time, location, product, context, service, or the like. The recommendation engine may additionally generate and/or accumulate metrics, such as for association with talent in the vault, and therefore may issue scores, rankings, or the like.

The fulfillment engine 14 may provide one or more templates for the creation of sponsored advertisements, or for the association of content with other, primary content, and may thus provide content for delivery, such as from the content vault. The fulfillment engine may, based on direct or redirect delivery, deliver the content. The fulfillment engine may formulate, or may direct the formulation at a third party site, the content into a widget enhancement for third party content, as discussed further hereinthroughout.

Figure 2:
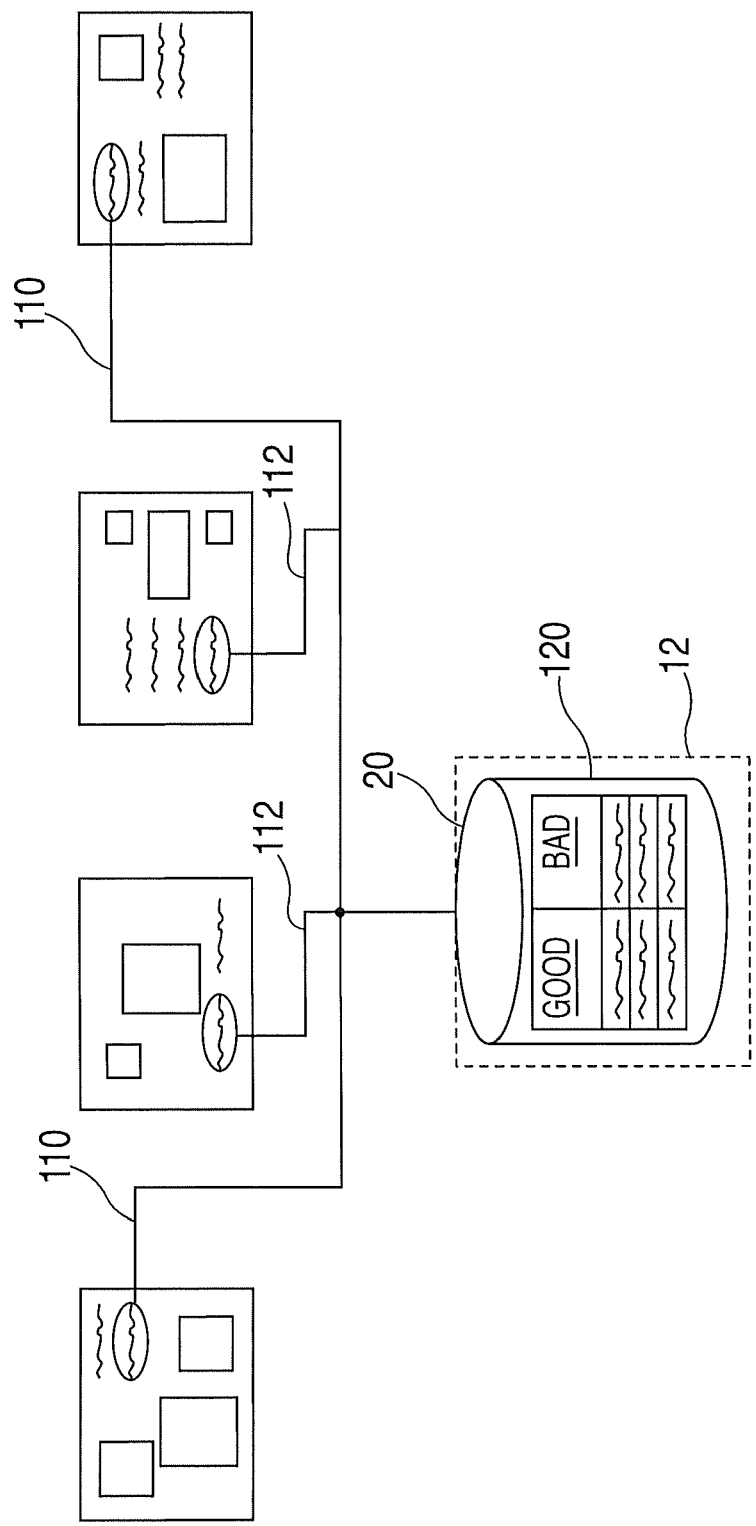
FIG. 2 is a block diagram that illustrates a metrics engine in accordance with the present invention.

As referenced hereinabove, the recommendation engine may provide metrics for sponsoring brands and talent. Such metrics may be gauged in any number of ways, certain of which will be apparent to those skilled in the art in light of the disclosure herein. For example, as illustrated in FIG. 2, positive 110 and negative 112 mentions of brands 114 may be tracked, such as by comparison of those brands with predetermined sets and/or subsets of "good" and "bad" keywords 120 for association with those sponsoring brands. Thereby, valuation may be assigned to certain keywords in the present invention, and the value of certain sponsoring brands may be tracked, based on association with those keywords, over time, in certain geographies, in certain markets, in certain contexts, and/or with regard to certain products or services, and the like. Keywords may, of course, be "good" to be associated with, meaning such keywords are indicative of positive associations with the sponsoring brand, "bad" to be associated with, meaning such keywords are indicative of negative associations with the sponsoring brand, or "neutral."

In an exemplary embodiment of the present invention, a football player is mentioned in association with a particular keyword. The keyword association may be assigned a +1 to +10 rating for a positive keyword associative mention, or a −1 to a −10 rating for a negative keyword association. Additionally, if the associated keyword is flagged for association with the sponsoring brand searched, but in actuality does not apply for any one of a number of reasons, such as an unreliable source or an actual reference to a different party, the association may be marked with a N/A, for example. Such associations and keyword rating of mentions may be performed automatically, or, upon flagging of a particular sponsorship brand, may be performed manually. Manual searchers may, needless to say, receive training in order to use consistent numerical ratings for associative mentions. Further, manual searchers may receive retraining such as wherein, for example, 100 searchers rated a particular mention or series of mentions as a +5. In such a case, such mentions or similar mentions may be repeatedly re-routed to a particular searcher-in-trainer until that searcher in training begins to rate such mentions within a predetermined acceptable variation of +5.

Thereby, a brand or talent may have associated therewith a "heat index," wherein the greater the total positive rating for all keywords tracked in all markets tracked may constitute how "hot" a sponsor is globally, and similarly a total negative rating would track how "cold" a particular sponsoring brand was. This heat index may, for example, be or become part of a widget enhancement. Needless to say, the above is exemplary in nature only, and similarly tracking could occur not only on a positive or negative association basis, but additionally on a geographic, product, service, context, or other basis. For example, the aforementioned "hot" and "cold" rating system may be used to draw a geographic "heat map," wherein the rating of a sponsoring brand in particular geographic markets may be laid out on a map illustrating the hotness or coldness of the sponsoring brand uniquely in each geographic market tracked.

More specifically, a brand or talent may have associated therewith a threshold rating, such as to provide a baseline of different levels to different talents having varied achievements over lengthy time periods. For example, a talent may have an achievement score as part of a "heat" score, wherein the achievement score may be an awards score. More particularly, a particular baseball player may be rated on a score scale of 100 for "heat" or "positive rating". The player may receive 1 point for each All-Star appearance, 3 points for each Most Valuable Player Award, 1 point for every 3 years played, 1 point for a playoff appearance, and 10 points for election to the Hall of Frame, and these points may be permanent to each player, or may be assigned a decay factor that lowers the awards points over time. This score may be added at all times to the tracked score for mentions of that player on the aforementioned 100 point scale.

By way of example, the enhancement widget may be provided for association with a reference to a particular subject of interest, and such widget may provide, for example, metrics associated with that subject of interest. Such a widget may allow for the provision of certain enhanced media, in the form of secondary content to the primary content related to the subject of interest, as is understood to those skilled in the pertinent arts. The enhanced media may include advertising for association with the primary content, that is, for associations with the subject of interest. The widget content may thus be located responsive to query engine 10, may be content obtained from the vault by recommendation engine, and the widget may be formulated via fulfillment engine 14.

In accordance with the recommendation engine, a recommended image enhancement widget may provide website providers and publishers with contextually relevant content for items featured in, for example, editorial images. The widget, such as upon discovering an enhanceable image, may use the enhanceable image as a background to deliver the contextually related content without impacting the layout or other content of the subject website. Conversely, the contextual linking of the enhancement widget to other aspects on the page may allow for use of the "real estate" on the page in which the enhancement resides by the publisher to mine not only the use of the publisher's site, but also the use of the enhancement widget.

Further, the ability to deliver the widget in the instant invention may provide a network of, for example, advertising inventory. As such, the image enhancement widget may be recommended by the recommendation engine, and/or may include, or be linked to, content in the vault.

Figure 3:
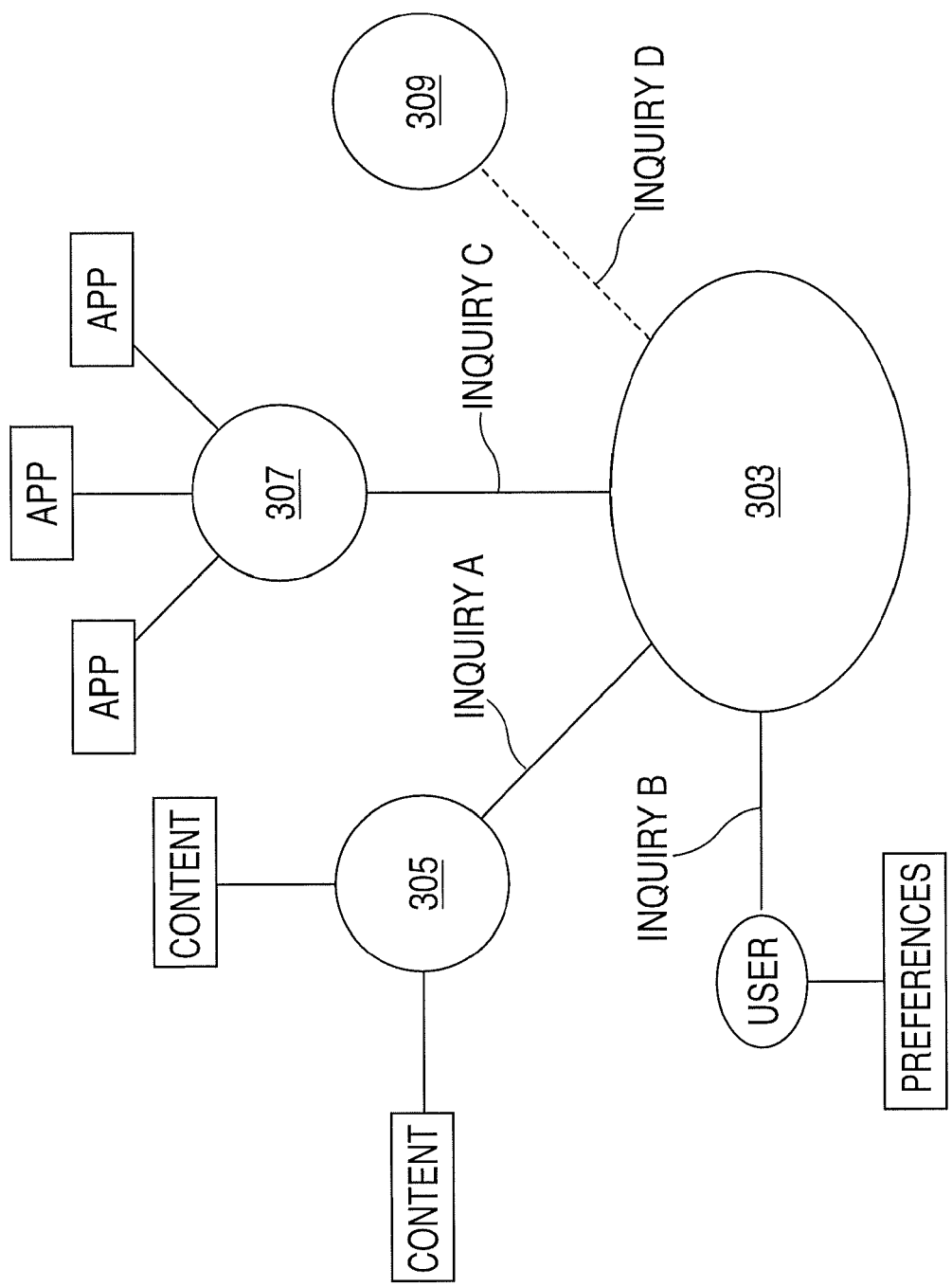
FIG. 3 is a block diagram illustrating a networked enhancement system.

More specifically, FIG. 3 illustrates a networked embodiment 301 for providing enhanced content in accordance with the present invention. As discussed hereinthroughout, the enhanced content may be or include, for example, a widget, such as a Flash widget or multiple widgets, such as multiple Flash widgets. As illustrated in FIG. 3, a networked embodiment may include an enhancement decision engine 303, having communicatively connected thereto at least one user as discussed hereinthroughout, at least one content producer 305, at least one application provider/developer 307, and, in certain embodiments, a data engine 309 for collecting and distributing data with regard to third parties, such as popularity data with regard to the subject of a picture to be enhanced, as discussed hereinabove. The data engine may include, for example, one or more of the engines discussed and illustrated in FIG. 1.

More specifically, a user may be, for example, a user of a particular website, and the user may have preferences with regard to the user's use, such as preferences in the form of cookies, a profile, or the like. The enhancement provided by the enhancement engine may preferably take into account the user's preferences.

The content producer may produce content for production to one or more of the users. Such content may include, for example, video content, audio content, audio-visual content, data content, or the like, and such content may be received by the user using one or more applications. The applications/application developers/producers illustrated in FIG. 3 may provide the applications whereby the content produced by the content producers is received. Such applications may, for example, be indicated by the aforementioned user preferences, may be indicated by the website on which the enhancement engine is to make the enhancement, may be indicated by the content producer or the type of content produced, or the like.

As discussed above, the data engine may provide relevant data with respect to third parties, such as parties illustrated in or by content on the subject website that is to be enhanced by the enhancement engine. Such third party data may include, for example, access to the same images that are produced on the subject website to be enhanced, such as to allow for the enhancement engine to expand, shrink, repeat, or otherwise modify a picture for enhancement, data on the use of social websites by the subject of the content to be enhanced, local, regional, national, or international data on the popularity or frequency of mentions of the subject of the content to be enhanced, or the like, as discussed further hereinbelow with respect to FIGS. 5-14.

The enhancement engine discussed herein throughout may first make a judgment as to whether or not content on a particular website is eligible for enhancement. This question is answered by the enhancement engine through the making of a series of four inquiries, labeled herein as Inquiry A as between the enhancement engine and the content producer, Inquiry B as between the enhancement engine and the user, Inquiry C as between the enhancement engine and the application developers, and Inquiry D as between the enhancement engine and the third party data engine. Inquiry A may include, for example, the subject or type of content produced by the content producer. For example, Inquiry A may return information that the subject of the content is Tiger Woods, a Ford car, a particular key word, or a frame or frames of video. Inquiry B may include user-centric data, such as media type, device type of the user, application requested by the user, preferences indicated for the user, and the like. Inquiry C may indicate which of a set of available applications the user prefers, which application the content produced or requested requires, or which application is best indicated for production in accordance with a particular business model, such as which application costs the least to produce, or has offered the greatest payment in exchange for being produced, or the like.

Needless to say, particular data or media type may be necessary for implementation of particular applications responsive to Inquiry C, and a lack of this data in accordance with Inquiry D or Inquiry A, or an incompatible media type in accordance with Inquiry A, B, or D, may preclude production of a particular application in accordance with Inquiry C. In such a circumstance, the incompatible application should not be produced by the enhancement engine in accordance with Inquiry C. Inquiry C may additionally produce other responsive information in accordance with production of a particular application, such as the size, form, wrapping, or manner of enhancement to be produced by the application upon instantiation, or the like.

Finally, Inquiry D may access third party data relevant to the enhancement produced by the enhancement engine. Such third party data may be relevant to the subject of the content for which the enhancement is to be produced, or the like. The third party data engine along Inquiry D may produce third party data temporally, that is, as a last second bind to the enhancement, or as a prebind responsive to the production of particular applications along Inquiry C or Inquiry A, for example.

In an exemplary embodiment of an application selection, discussed with respect to FIG. 3, a female user may be present on the New York Times website. As such, the enhancement may be aware of information with respect to the particular user, including the interests of the user and/or the geography of the user, for example, the website on which the user resides, and the subject of content then in view of the user on the subject website. Based on this information, and the availability of numerous applications, the enhancement engine may select, such as for a last second bind, what application to load to best meet the interests of the user, and what third party data to draw on to make the best use of the selected application in light of the content produced to the user and the user preferences, for example. This stands in stark contrast to the current art with respect to, for example, smart phone usage, wherein an application is selected for recommendation to a user because that application is among the most frequently downloaded, or because that application costs a certain amount of money to purchase, for example.

More specifically, application sets may be available in particular categories, such as is known in the available art. For example, application categories may be modified in accordance with a particular user. More specifically, a particular set, Set N, of applications may be akin to search results produced by a search engine, that is, those particular applications, based on the data mind, may be most likely the preferred applications for that particular user. Such data mined may include prior use of applications, user preferences, or the like. A second set of applications may be paid applications, such as applications that pay on a pay-per-click, on a click-through, or the like. In such a circumstance, production of a particular application may allow for calculation of a click-through rate, from which an amount owed by the application provider may be calculated. Likewise, an application set may be divided based upon segmentation. In the current art, segmentation occurs by the siloing of particular key words, such that many advertisers aren't competing on the same page, for example. Applications and/or content may be similarly segmented in accordance with the enhancement engine of the present invention.

Further, in certain exemplary embodiments in which a selected application or category of applications is an advertising provision application, applications may be categorized based on typical relevance or frequency of clicking, such as wherein typically not relevant or infrequently clicked advertisements must pay more per click or click-through to be provided to a user. Correspondingly, a certain set of applications and/or advertisement applications may be used to assess typical relevance, or frequency of selection. For example, a particular subset of applications, advertising applications, advertisements, or the like may be randomly rotated by the enhancement engine of the present invention. The random rotation may allow for a measure of the actual popularity, actual relevance, or frequency of acceptability of particular applications and/or advertisements. For example, a particular application may be run for all users having cookies indicating that the users are golfers, but the category of applications served, may, in accordance with the response received, indicate that a particular application or advertisement is actually most popular with female golfers in the state of California. Thereby, a subset of applications and/or advertisements may be randomly provided, or randomly provided to a particular subset of users, in order to obtain an indication of micro segmentation as discussed herein.

Additionally and alternatively, the enhancement engine may provide a category or subset of applications that are locked, that is, that are always provided in certain circumstances. For example, such locked applications may always be provided to particular users, may always be provided to particular users on particular websites, or may always be provided when the content is of a particular topic, due to the fact that the provider of the application is providing some value to the website provider and/or the enhancement engine.

Yet further, a subset of applications may be selectable by the user. For example, the enhancement engine may provide an "app store," whereby the user can scroll, such as to the right, left, up, or down, and view applications that are recommended for that user, that have been popular with other users of that type, that fit particular cost criteria, or that the user has used most frequently in the past, for example.

Thus, as discussed hereinabove with respect to FIG. 3, an application may be an advertisement application, or simply and advertisement, in accordance with the present invention thereby, an application may be tailored to only certain users, or only certain users on certain pages, or only on certain pages of a website, or only for certain content, but, because the application is an advertisement, the present invention provides a contextually relevant application advertisement to users. Further, because the enhancement engine allows for a dynamic mining of Inquiry A regarding content produced, an advertiser can design an application that can target content related to all NFL players, or only one particular player, or only one particular team, or only one particular player and only in the New York Times, or only one particular player to particular fan types of that player on the New York Times, in accordance with the present invention. Such targeted advertising is not presently available in the current art.

As such, the enhancement engine may function as an optimizing ad server. Historically, ad servers inquired only as to user preferences and content consumed. In contrast, the ad server of the present invention may perform a heuristic analysis of a particular web page, and thus is user sensitive, content sensitive, and context sensitive. For example, in the above example of the current art, information as between amazon.com and the Amazon rain forest is indistinguishable with regard to a typical ad server. However, the heuristic analysis of the present invention allows for a context sensitivity that gives insight into the distinction between a user researching a purchase from amazon.com and a user researching the Amazon rain forest.

This heuristic analysis may allow for selection of a particular application along Inquiry C in FIG. 3, and/or for selection of a particular application set. For example, a user may be provided with two gaming applications, three informational applications, and one video application. Different applications may be provided to the user because the present invention, through the heuristic analysis mentioned above, is aware of what application the user typically picks from a provided set of available applications, or what application the user has repeatedly picked, and further the present invention is aware of what applications the user is using currently, thereby enabling the service of advertising applications that are contextually relevant to the user's current use of applications on a particular website, the content in view on the website, and the user's known preferences.

Figure 4:
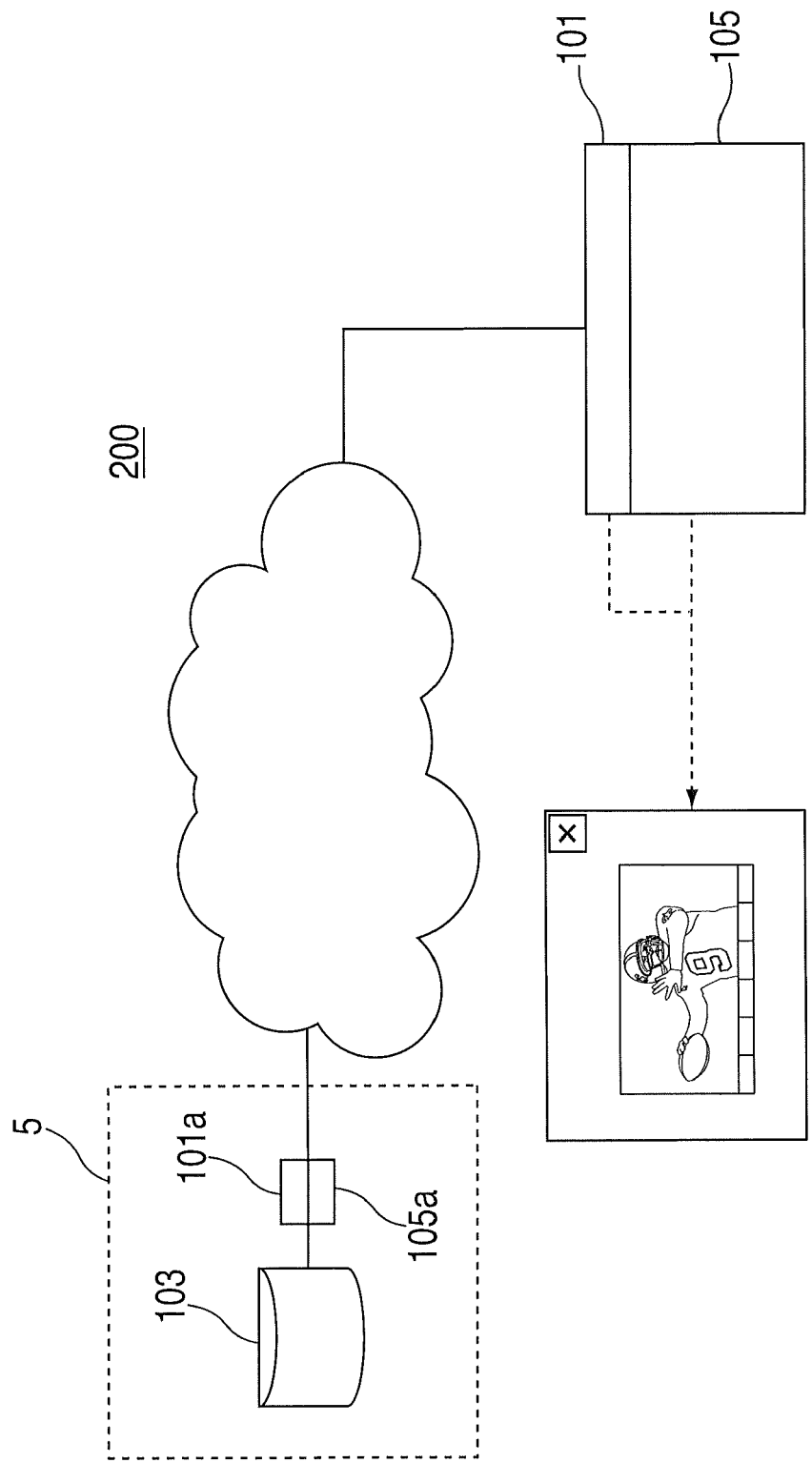
FIG. 4 is a block diagram illustrating components of an enhancement widget in accordance with the present invention.

FIG. 4 illustrates an image enhancement widget system 200 may include three principle components. These components are a javascript component 101, content 103 from the vault associated with the recommendation engine, such as content obtained by or from the talent server inclusive of the recommendation engine, for association with and/or relation to a talent, and a flash widget 105. Each of the javascript 101 and content 103 may be provided by the recommendation engine discussed hereinabove, and most preferably via the talent server within and/or associated with the recommendation engine. The flash widget 105 may preferably be provided by the fulfillment engine, according to instructions and content received from the recommendation engine.

The javascript component 101 may, for example, be a publisher-side javascript. The publisher, side javascript may locate enhanceable images on the publisher's webpage, and provide set up for the flash overlay widget 105 atop the enhanceable image. Provision of the enhancement 105 may be enabled by placement of, for example, a single line of publisher-side javascript onto the publisher website that the publisher wishes to have enhanced. The publisher-side javascript 101 may be added to a website by the publisher in, for example, a one-time set up. Following installation, the publisher-side javascript may be further configured remotely as discussed hereinthroughout, by either the publisher or the enhancement provider, for example.

Additionally and alternatively, a proxy server, for example, that is or is associated with the data engine or the enhancement engine discussed herein with respect to FIG. 3, may intercept the render of a page on which the enhancements discussed herein are permitted. The proxy server may write in one or more lines of the aforementioned javascript component 101, either upon initial render or upon each rendering, and may re-render the page with the javascript inserted.

In an exemplary embodiment, the javascript component 101 may identify images on a webpage, including enhanceable images, and including images subject to required criteria for enhancement, such as size ranges, aspect ratios, or the like. Upon identification of an image, the javascript 101 may capture caption text related to the image, alternate text ("alt-text"), and/or an image URL, for example, and may send those elements to the talent server and/or recommendation engine, as illustrated. Further, the javascript may display an alert to show a user that a particular image is interactively enhanceable, such as when instructed to display an alert by talent server and/or recommendation engine. Further, the javascript component may enable set up of the enhancement/flash overlay widget 105, such as by specifying size, location, publisher, talent identification, menu inclusions, and the like, when a user clicks on or mouses over an enhanceable image. Finally, the javascript component may dismiss the flash enhancement based on an appropriate user action.

For example, the javascript response may dictate, or have dictated thereto, one or more aspects of the enhancement 105. For example, a pop-up of the offer to enhance, or a thumbnail of the enhancement, may be inserted or ghosted onto the page. Further, the javascript may set a cookie when the enhancement 105 is moused-over, opened, or closed.

In a preferred embodiment, the javascript component may not impact an existing page layout. Neither may the flash enhancement 105, as discussed further hereinbelow, affect the page layout. The javascript component may include an awareness of sight specific design elements, and browser limitations, for example, such that, if unknown elements or unsupported browser aspects are encountered, the javascript component may dis-enable itself. Further, it is preferred that the javascript not appreciably impact load times for the publisher's site. As such, the javascript component may begin activities only after all native website operations have ended for the particular website.

The javascript component may additionally be self updating. As such, the javascript component may change or improve over a period of time. In a preferred embodiment, the website publisher may not be responsible for maintaining the javascript component after installation, but rather the javascript component may check for available downloads of updates at a pre-determined time frame, such as daily, for example, and such as from the recommendation engine, for example. Yet further, the javascript component may preferably be bandwidth neutral with respect to additional traffic over a particular bandwidth.

Thus, the javascript component may be authorized by a particular publisher to enhance any page, or item on a page, that meets certain criteria, such as a size limit, for example, that will allow for enhancement of the item on the page without obscuring the original item or items on the page. If the criteria are met, the javascript component may be installed, and may awaken upon each instantiation of the page, asking for any updates to the javascript component, such as from remote locations, such as the talent server. If no updated versions of the javascript component are available, or after an update is downloaded, the javascript component may assess the images or items on the particular publisher's page, such as by comparison with the criteria, in order to assess which of the images or items may be enhanced. Upon the assessment of which images or items are authorized for enhancement, the javascript component may optionally download the images or items, or certain of the images or items, as a background for the enhancement. The javascript component may then read a text string, such as from an xv header, and may send the information read to a remote location, such as the talent server. The xv header may include, for example, a pix size, an image source, and/or associated textual information, for example. The javascript component may, either prior to sending the information to the talent server, or as information is sent to the talent server, provide to the talent server information related to the reading of the text string, and/or to the assessment of the application of the criteria for the enhancement, for example.

As used herein, the talent server may be or include, individually or in the aggregate, the vault discussed herein and the recommendation engine, wherein the recommendation engine may also serve to authorize enhancements in accordance with certain criteria. The talent server may communicate with the publisher's side javascript component and the flash enhancement widget. When communicating with the publisher's side javascript component, the talent server may manage all communications to and from the javascript component, download images and/or read header files for image or item information, recognize particular talent or entities using header files and all image descriptive texts, indicate to a talent server side javascript the names of talents, certain identifications, such as of image locations, and other required information for the calling of the flash enhancement, download site specific enhancements, and/or provide cache and similar storage, among other functions. The talent server may store, such as in the vault, for example, the myriad of information that may be made available through the flash enhancement, images and information regarding a variety of talent, and the like, for example.

The flash enhancement widget may be a dynamically sized micro site that may use a host image as background in order to provide additional information, preferably related to the subject of the host image, for example. The flash widget may be configured as an overlay, a cascade out of an image into a fixed size and/or relative position, a dropdown menu or series of dropdown menus, and/or an expandable menu or series of expandable menus, or the like. The flash widget provides additional, contextually relevant content regarding the talent featured in an editorial image or item. Through the provision of this contextually relevant content, users may spend additional time on a particular publisher's page. Further, a contextually relevant advertising opportunity may be provided.

The micro site nature of the flash widget may enable various and diverse functionality. This functionality may be dynamically sized and/or modified, such as to fit dimensions, aspect ratios, page location, and the like, of a particular image, and/or to fit similar criteria set forth by the publisher. Likewise, in order to avoid interference with the surrounding webpage, the flash component may have opaque, translucent, and/or transparent components, may continue to display the underlying image, may display the names of the talent discovered in the image, and may have a close, or "X," button, in order to dismiss the flash widget and return to the original view of the underlying image.

Moreover, the micro-site nature may allow for re-direct functionality. For example, and as discussed further below, a request within the enhancement for an article, such as is discussed below with respect to FIG. 8, may provide a re-direct to the site where the article is provided. The location of the article may be stored at the data engine discussed above with respect to FIG. 3 (and, correspondingly, with respect to the recommendation and/or talent engines discussed herein). Additionally, the micro-site nature may allow for an outright dismissal of the enhancement by a user, which may cause the disabling of the javascript component 101, and consequent access to only the underlying site content. For example, disabling/dismissal of the enhancement may cause the clicking of a picture on the site to simply execute a quick scroll on that page to the article text to which the picture relates.

In an exemplary embodiment, and in order to fit a dynamic sizing of an editorial image, a widget may be available from the talent server in multiple modes, such as small, medium and large. Upon loading, the flash widget may select the particular mode, and may self-size to the exact dimensions of the underlying image, or of the expanded image, as desired. By way of example, a small mode may be 300×250 pixels, a medium mode may be 400×300 pixels, and a large mode may be 600×400 pixels, wherein the mode selected is that mode which best approximates the size of the underlying picture.

Further, it is often the case that an editorial image may include more than one talent, or a caption associated with an editorial image may refer to more than one talent. Thus, the flash widget may provide, for example, interactivity, such as a dropdown interface, to allow a user to select what talent to browse in the particular image. Thus, the flash widget may provide a micro site for each subject talent in a particular editorial image including multiple talents. Needless to say, the talent placed at the top of such a dropdown interface may vary based on which talent is being most frequently selected by users with respect to the particular associated editorial image, for example.

The assessment of the subject or subjects of an editorial image may be made, as referenced above, by the javascript component, and may also be made or partially made by the talent server that provides the flash widget. For example, as discussed above, the flash widget may be provided in accordance with information in a header, but, in the event insufficient information is provided in the header, a publisher may provide alt-text, that is, publisher captions, to provide the necessary information, or the javascript can estimate on behalf of the flash widget, such as by reading the entire page and assuming that which is closest to the editorial image is a caption, and the closest caption presumptively includes information on the editorial image.

It almost goes without saying that the present invention overcomes significant bandwidth limitations. For example, it is desirable that the javascript component may do a significant amount of processing, or that the processing may be allotted to the talent server, or that the javascript may be updated on a less frequent basis, for example. Further, by use of the javascript component to read the page header, it is the publisher's site bandwidth, rather than the talent server bandwidth, that will be used in order to assess the enhanceability of all images. Finally, bandwidth may be conserved by allowing the user to first instruct that certain processing occur, rather than doing so automatically. For example, the micro site flash download may only be provided if a user clicks, for example, a button indicating that the editorial image is interactive. Further, in order to provide additional time for download of the flash enhancement and/or to provide additional revenue, advertising or the like may be downloaded and/or shown to a requesting user as the interactivity is downloaded.

Thus, the present invention may allow for the ready installation of the javascript component, such as on a site HTML template. Related information and/or related articles referencing a selected image, or multiple such methodologies, may be selected, such as the selection of RSS feeds. The settings for an enhancement may be selected, such as the criteria and/or content of such enhancements. Further, a publisher may select the look and feel of a particular flash overlay widget, for example.

For example, a publisher may select, as to look and feel of an overlay widget, colors, textures, images, button layouts, sizes, shapes, and the like. Further, certain components may be selected as only conditionally shown to users when certain conditions are met. Additionally, the enhancement widget may include a menu, and the menu may be constant, placed in certain positions, or float to increase convenience of use. Further, publishers may select the criteria for production of the enhancement, such as minimum or maximum image sizes available for enhancement, sites, pages, page sections or site sections available for enhancement, use of a floating widget for particularly small images, or the like. Thereby, a publisher may select a look and feel most likely to sustain interest from users of that particular publisher, which, of course, are the users that publisher will know best, Thereby, the publisher's contributions, in conjunction with the present invention, are likely to increase user exposure to publisher's content.

This exposure may be further enhanced by providing, such as through the flash enhancement widget, links to related stories or images using existing RSS feeds, search and content management capabilities, and the like, which may be provided by the publisher or a third party, and which may be provided from that publisher website, or other websites associated with that publisher, for example. Further, user exposure may be additionally maintained through integration of, for example, third party information, such as third party images, videos, statistics, and the like, including, for example, the metrics discussed hereinabove with respect to FIGS. 1 and 2. Needless to say, increased time on a page view may additionally provide increased revenue for the provider of the page, particularly in light of the fact that the present invention may be provided at no cost to the publisher.

Revenue may increase to the publisher not solely in light of increased user engagement and lack of technology investment, development, or provision costs. Publishers may additionally receive value through access to information regarding subject talent of images used on that publisher's website, such as the aforementioned metrics of that talent received from, for example, the talent server, as assessed across multiple websites. Further, the publisher may receive a revenue share on ecommerce transactions related to, for example, advertising provided in conjunction with the flash enhancement. The provider of the flash enhancement may provide this advertising, such as from the talent server, thereby providing an exclusive advertisement position for enhanced images for the provider of the flash enhancement. Further, the provider of the flash enhancement may receive a share of other ecommerce transactions related to the flash enhancement, and may further receive branding and/or links made available through the flash enhancement.

More particularly, the flash enhancement may be ecommerce enabled. For example, shopping support may be provided from third party on-line shopping providers, which third party providers may be relevant to the subject of the editorial image. For example, an on-line team fan shop may be provided as shopping support through an advertisement placed in a flash enhancement widget related to a talent in an image that plays for the team associated with the team fan shop. Likewise, ticket purchasing advertisements, either by teams or third party providers, such as Stub Hub, may be highly targeted to users who have selected to view a flash enhancement related to a subject talent on the particular team for which tickets are offered. Real and virtual sales, memorabilia, clothing, and the like may be provided in association with the flash enhancement advertising. Of course, sponsorships may also be provided in association with the flash widget, thus providing another opportunity for advertising revenue in association with the flash enhancement.

Thus, in an exemplary embodiment, responsive to the javascript component and information assessed by the talent server, the flash enhancement may provide a myriad of information with respect to the subject of an editorial image, such as a professional athlete, in a format selected by the publisher of the site containing the editorial image. For example, a series of clickable menu buttons may be provided via the flash enhancement, wherein each button includes information related to a professional athlete shown in the editorial image on which the flash enhancement is overlayed. Such a clickable menu may provide information on the professional athlete such as biographic information, background information, statistics, team information, such as box scores and standings, and the like. Further, social information may be provided on the athlete, such as the buzz and/or metrics associated with the athlete, recent postings by or about the athlete, real or virtual memorabilia, and/or advertising or media metrics wherefrom an assessment may be made of the propriety of using the subject player as an endorser for advertising, for example. Of course, a social rating may be combined with a "heat" rating and/or an achievement rating, as discussed above. Thereby, talent may be rated by an overall, combined score, or by a categorical score.

The information provided in relation to the player may be highly targeted, such as by making use of related articles or feeds from the publisher of the site under enhancement, or from other sites by that publisher, internal or external related articles, relevant blogs or blog postings by the player or fans of the player, or other images of the player, for example. The social engagement in relation to the athlete may allow for reference to the athlete's social websites available to the public, or chatter about the athlete on social sites, recent blogs or postings about the athlete on social sites, or addition of the athlete, or a widget associated with the athlete, for example, to a user's social site, for example. Likewise, shopping, sweepstakes, trivia, and fantasy sports support and/or integration may be made available with reference to the particular athlete.

Figure 4A:
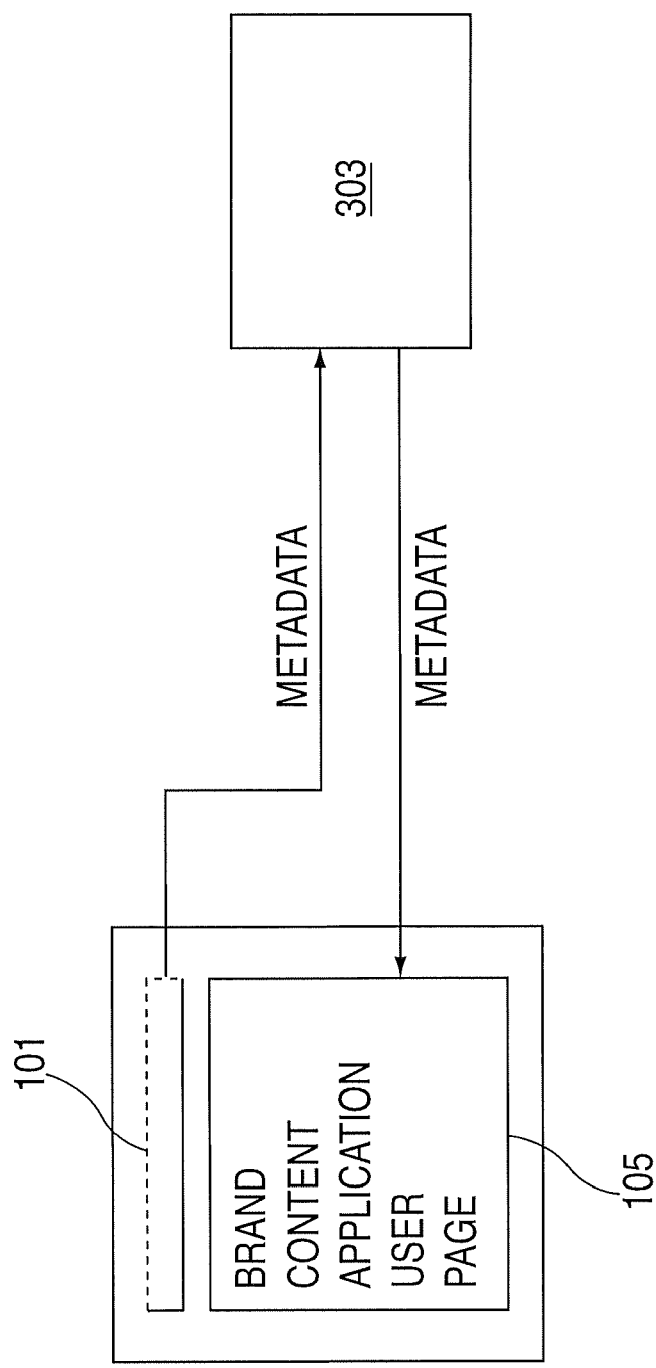
FIG. 4A is an embodiment of a metadata selection system for the enhancement widget of FIG. 4.

More particularly, FIG. 4A is a block diagram illustrating an exchange of metadata that may allow, for example, a flash shell, such as that correspondent to the aforementioned flash widget, to institute an enhancement (by the enhancement engine) as indicated by the java component 101, such as Java script, such as a Java script header, associated with the particular web page on which the enhancement is to be instituted. As illustrated in FIG. 4A, a header and footer, such as the Java script header, may be placed on a particular web page to provide indications with regard to content on the web page, wherein the header and footer may indicate a brand or talent on the page, a location and/or context of the content relating to the brand or talent, a user or user preferences, the particular site of the page at issue, and preferably the objects or content on the page that are to be subject to enhancement. Java component 101 may execute the passing of this header and footer information, such as in metadata format, to the enhancement engine discussed herein. If the header and footer information indicate that a particular object requested by a user may be subject to enhancement, metadata may be returned from the enhancement engine, as may be additional content, to enhance the requested object.

More particularly, in an exemplary embodiment such as that illustrated in FIG. 4A, the execution of an enhancement may launch a Flash shell. The Flash shell, in a preferred embodiment, launches and enhances only the object or content, and/or only objects or content with respect to certain key word(s), and/or only content that is otherwise available to be enhanced, according to the decision of the enhancement engine. Correspondingly, the user may hit the back button at any time to return to an initial application, or may hit the back button repeatedly to return to the unenhanced page, for example.

In particular embodiments, the Flash shell may not elect what content to run as part of an enhancement. Rather, the enhancement engine may remotely elect what content to provide, and/or what application to run, as an enhancement on the web page on which the user is requesting content. This is in stark contrast to the prior art, wherein the election of particular applications to run on a subject page is generally made locally to the page, or by producers of the page.

The Flash shell may reach out into the network over which the present invention operates, to thereby access the enhancement engine as an "application selector." For example, the application selector may be connected to an application database engine, wherein multiple applications are available for accessing by the application selector. The application selector may create static application files, that is, the Flash shell may pull, in accordance with an instruction from the enhancement engine, static sets of applications comprising, for example, application numbers 1, 19 and 34, from the application database. These static files may be bound in the Flash shell as the Flash shell request is served to the user pursuant to an indication that content requested by the user is to be enhanced.

More particularly, one or more applications may be loaded within the Flash shell, and the Flash shell and the one or more applications are thus in continuous communication. Further, the Flash shell may, in certain embodiments, be in initial or continuous communication with the enhancement engine that has indicated that the Flash shell is to be provided. Thereby, the Flash shell, and consequently the user, may communicate with the one or more applications provided through the enhancement engine acting as a remote communications conduit. The Flash shell may be put in the foreground or the background for particular applications, subject to instruction from the enhancement engine.

In a specific example, if a user selects content, and is given several options for enhancement applications to be associated with the selected content, the user may select a first application/enhancement content in the form of a "Podcast." The Flash shell may consequently need to provide a podcast player application, such as in order to allow the user to view the Podcast. Further, for example, the desired podcast player application may be a proprietary third party video player application.

With regard to this example, a first application may notify the enhancement engine of a third party application required to play the requested application. Thus for example, a marketplace may be created whereby a first application (the Podcast above) may request the use of a second application (the proprietary video player application above), which may be owned, patented, developed, or the like by third party. The third party and the producer of the requesting application, or the provider of the content to be enhanced, or the provider of the web page to be enhanced, may negotiate the use of the proprietary video player with the requested application. Of course, this negotiation may be undertaken through an initial interaction between the enhancement engine and the application developers illustrated in FIG. 3, such as when the applications are submitted for use by the enhancement engine.

If the provider of the proprietary video player in the example above accepts that the video player may be used with the requesting application, a global unique identifier (GUID) may be provided to the requesting application, wherein such GUIDs are tracked as identifying a requesting application that is entitled to access the proprietary video player. Thereby, for example, the underlying video player may reside in an application data base, and have associated therewith 5, for example, GUIDs that indicate applications identified by the respective GUIDs as eligible to call the proprietary video player without, for example, additional payments. Needless to say, the proprietary video player and Podcast are used solely herein by way of illustrative example.

Those skilled in the art will appreciate that requested content and applications, and any required additional applications, may be provided to a user via a late stage bind, wherein only keyed GUIDs may call particular applications. The keyed GUIDs may solely call the applications pursuant to possession of a proper GUID, that is, calling applications may generally not gain access to additional or proprietary aspects of called applications, and may have no rights in called applications other than to call the called applications. In this manner, pop-out applications may be provided that may be dependant on, or that may be independent from, particular web pages, and, to the extent the applications are independent, such pop-out applications may be carried across multiple web pages.

By way of yet a more specific, non-limiting example, a provider of televisions may have recently won an award for its television sets. The present invention may provide enhancements to requested content, wherein the enhancements require playing on a video player application. The provided video player application may have an agreement to be provided in accordance with certain requested content, such as in conjunction with another requested application, and may or may not be the exclusive video player for all videos played. Further, the provided video player application may have the aforementioned television manufacturer as a sponsor, wherein, with each play of a requested video via the video player application, a banner ad, an advertisement, or an advertisement application may be provided, pointing out that the television manufacturer is the winner of a significant award. Yet further, the television manufacturer may be, in fact, the provider of the provided video player application. Thereby, the television manufacturer may play its advertisement and its application in conjunction.

In light of the discussion above, those skilled in the art will appreciate that multiple applications may be provided for the same or similar content requested by a user. As such, a contextual menu may be provided for all available applications available for enhancements on the subject page. For example, each available application may be included in a scroll bar, wherein the user may select the desired application with respect to the requested content. Each offered application may include an "About" screen or similar indicator of the application and what it does, wherein the "About" screen for the application may be produced upon selection of the application, as a pop-up when the application is moused-over, or the like. Advertisements may similarly be provided via pop-up or mouse-over of the applications, for example.

Applications may include simplified applications that are variations of smart phone applications, for example. Further, the providers of such applications having correspondent smart phone applications may include, within the applications provided, a referral to the correspondent smart phone application for use by the user on the user's smart phone. Upon selection of an application provided for enhancement, a user may be enabled to rate the application and/or an enhancement in accordance with the present invention, and/or any correspondent applications, such as a smart phone application, that the user may have used, and such ratings may be fed back to the enhancement engine to allow for improved application selection, such as with regard to users having particular preferences or the like.

Figure 5:
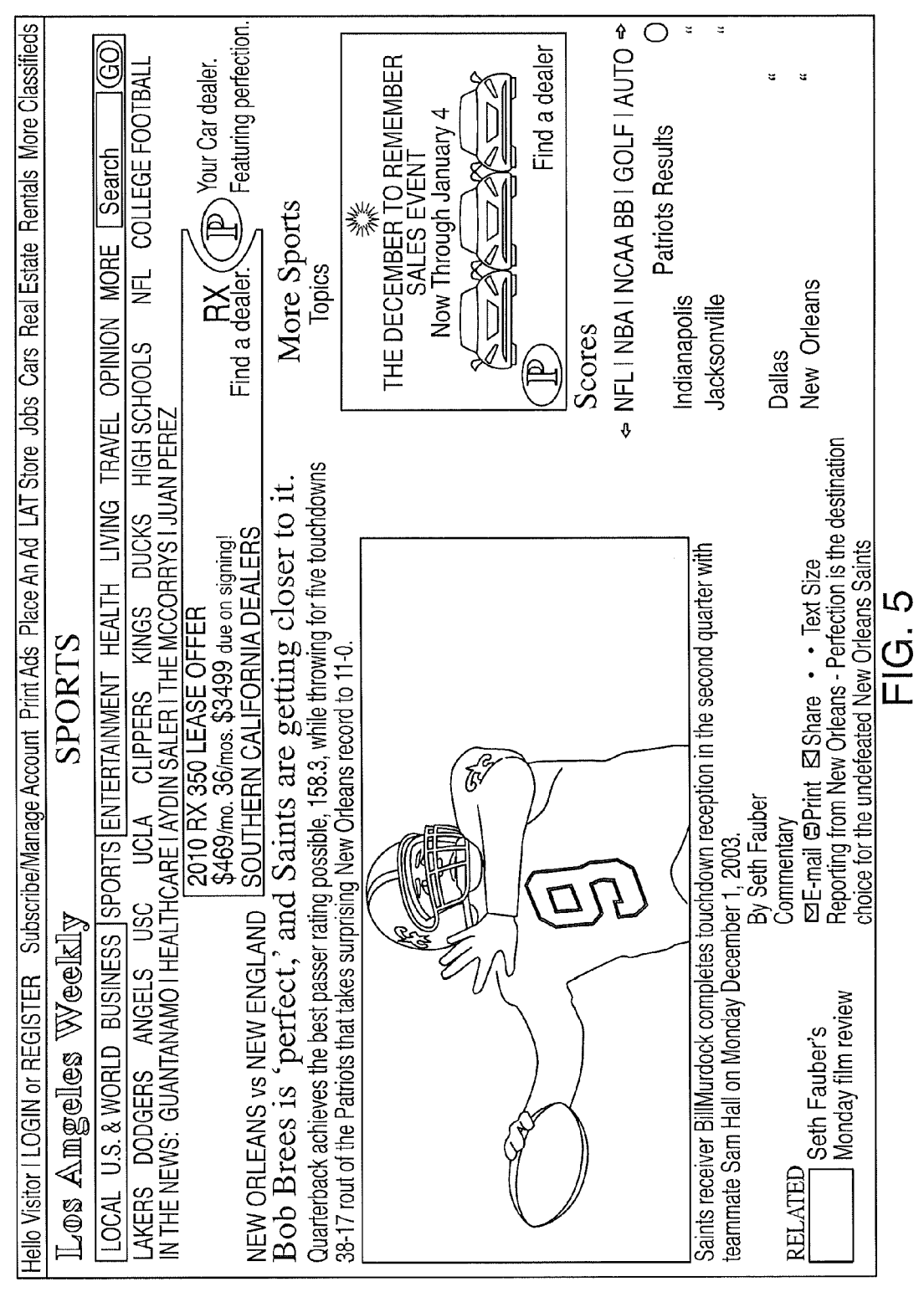
Figure 6:
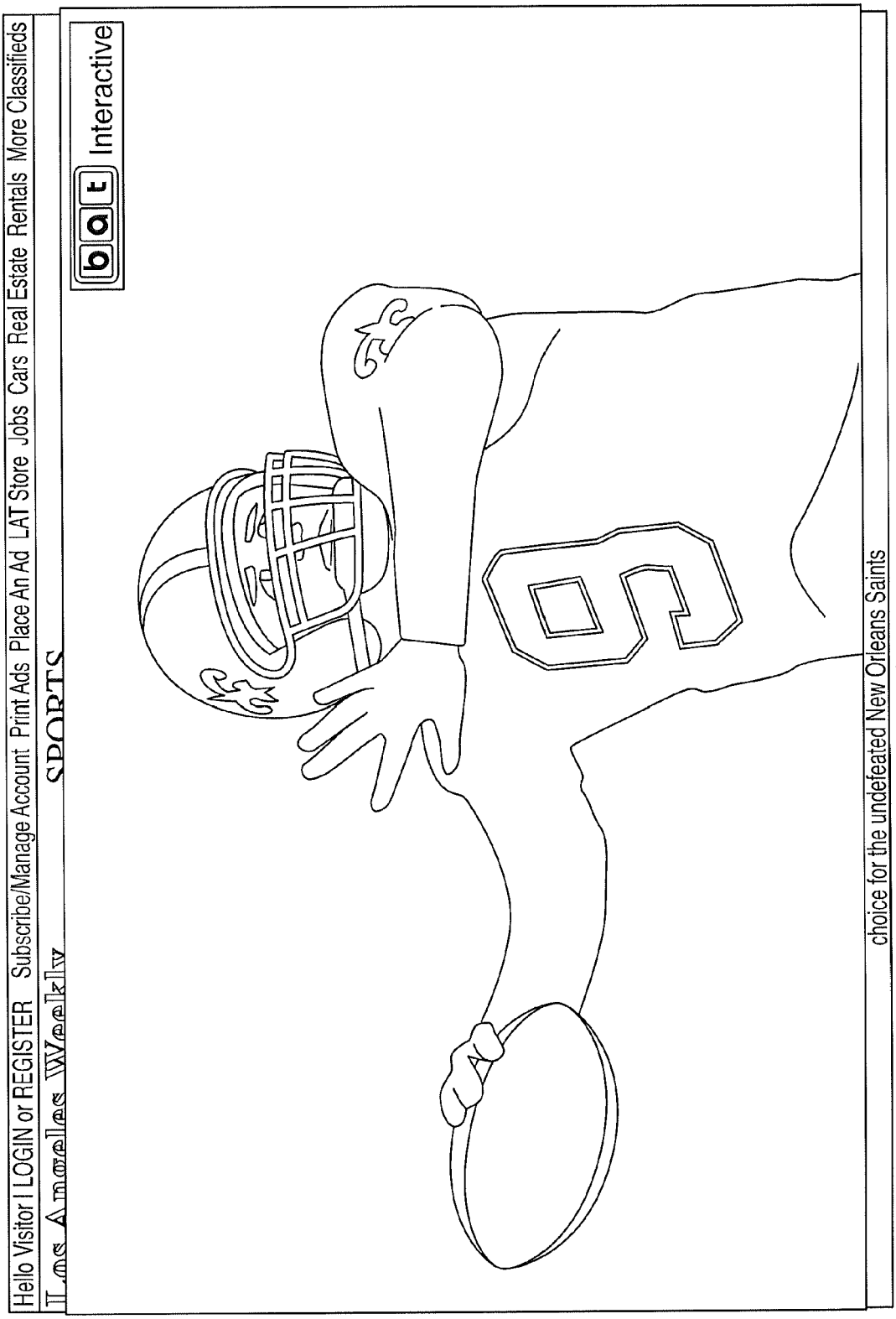
FIG. 6 is an illustration of an enhancement widget in accordance with the present invention.
Figure 7:
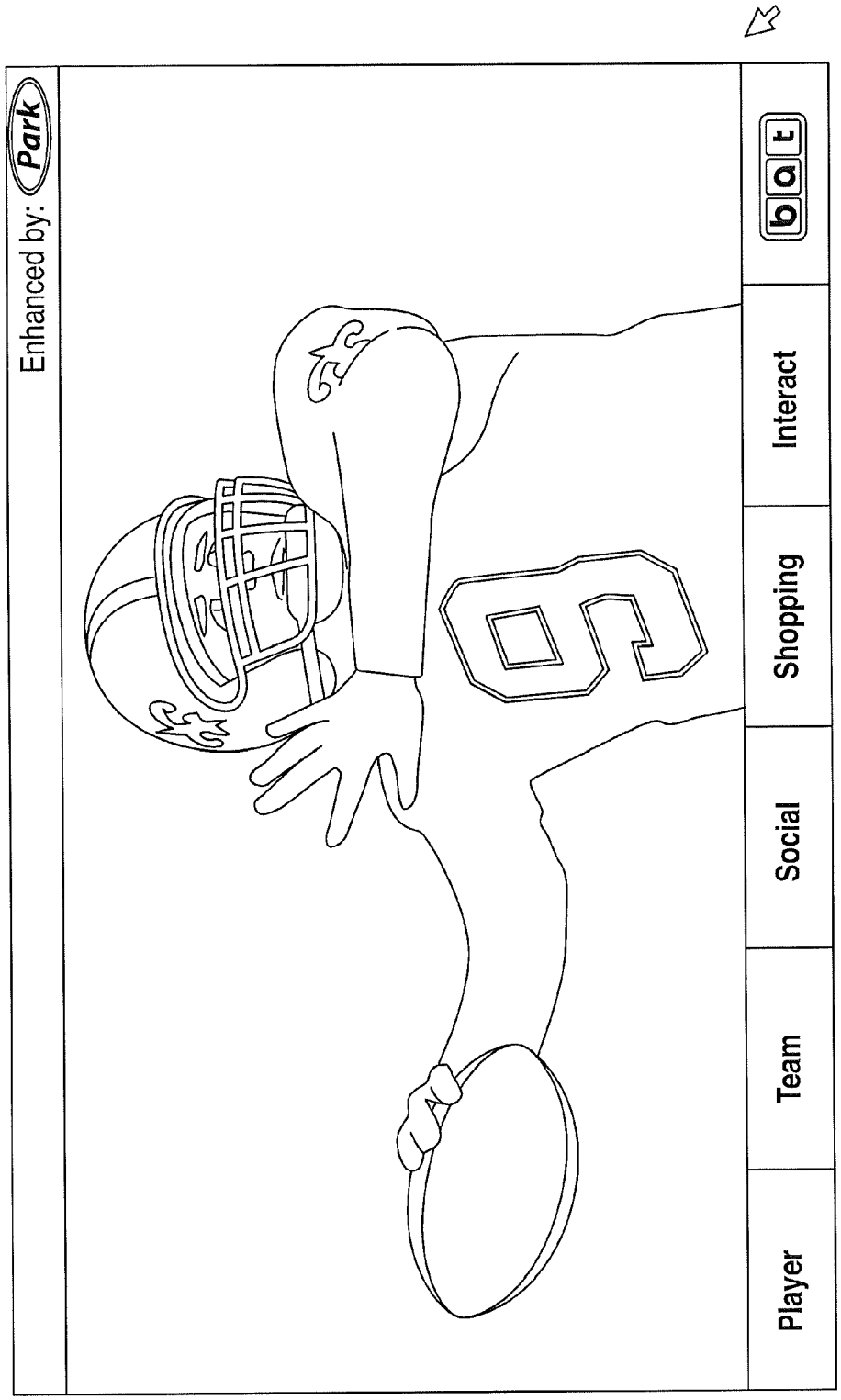
FIG. 7 is an illustration of an enhancement widget in accordance with the present invention.

FIGS. 5-14 illustrate an exemplary embodiment of the present invention. FIG. 5 illustrates an editorial image provided in association with a publisher's website. FIG. 6 illustrates that the subject editorial image may be optionally enlarged, such as upon clicking or mouse over, to enable use of the flash enhancement widget of the present invention. FIG. 7 illustrates a flash enhancement overlay placed atop the subject editorial image selected for enhancement. Of note, the overlay illustrates a top level sponsor for the enhanced overlay. Further, the overlay as illustrated includes information regarding the player, the team of the player, social aspects related to the player, shopping related to the player, and interaction with and about the player. Further provided is a branding and/or link to the provider of the flash enhancement.

Figure 8:
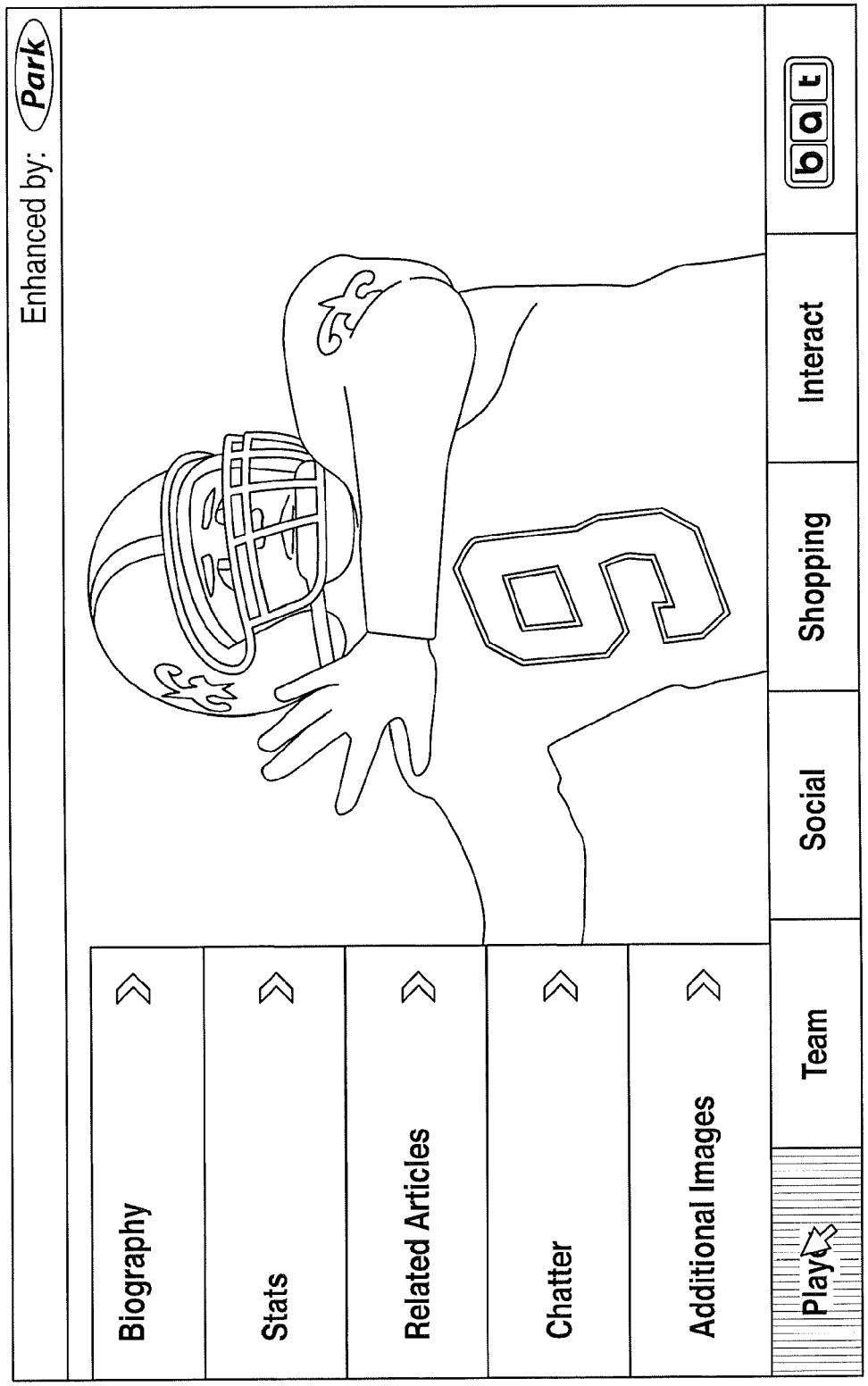
FIG. 8 is an illustration of an enhancement widget in accordance with the present invention.
Figure 9:
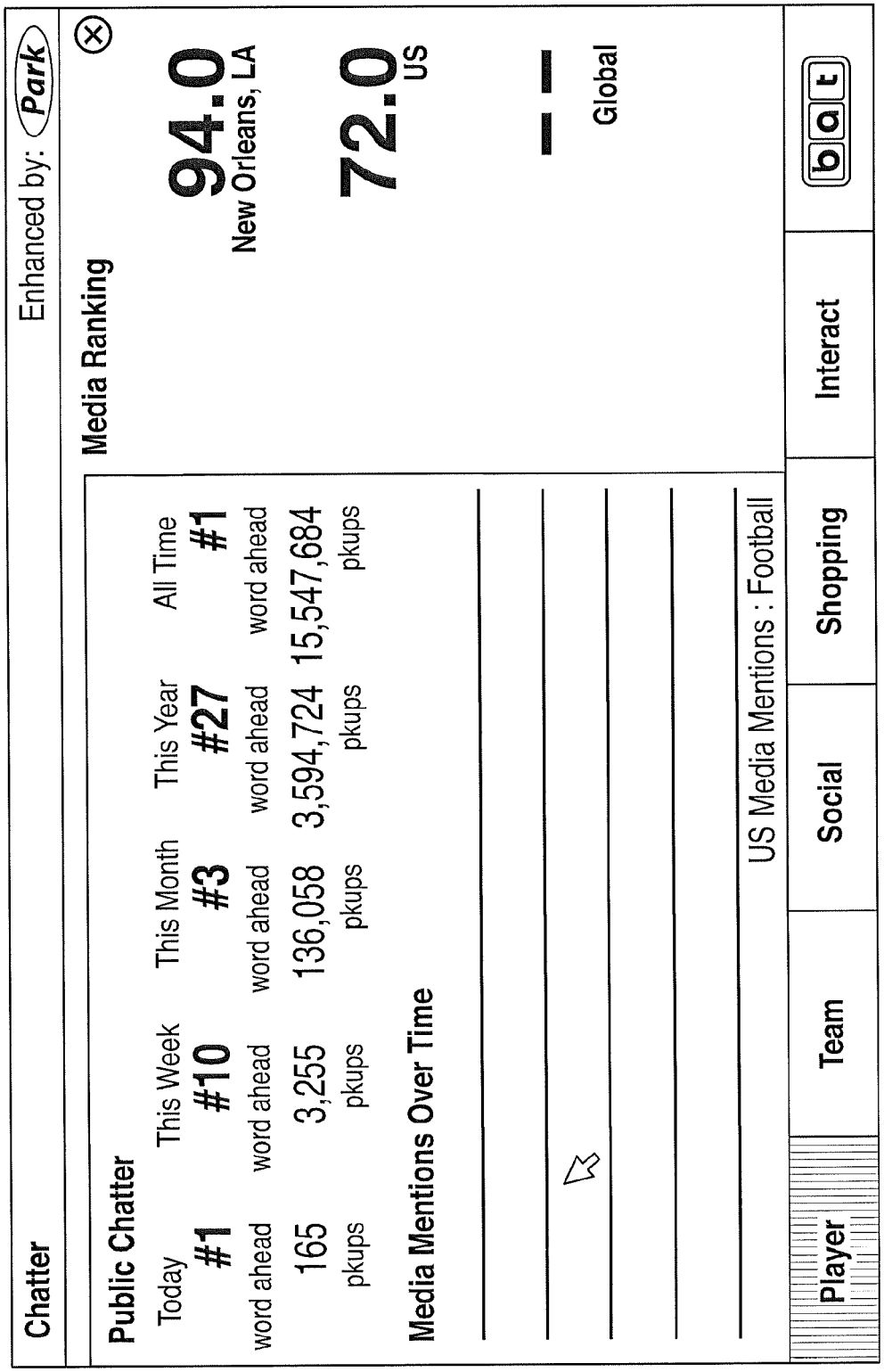
FIG. 9 is an illustration of an enhancement widget in accordance with the present invention.

FIG. 8 illustrates a mouse over or similar selection by a user of the player tab of the enhancement overlay. Selection of the tab may allow for presentation of numerous options with regard to the player, such as the biography of the player, statistics of the player, articles related to the player, chatter about the player, and other images, audio, or video related to the player, for example. The statistics of the player may include, for example, game and career statistics for the player, scores or articles about the most recent game in which the player has played, and the like. FIG. 9 illustrates the selection of chatter about the player. As illustrated, chatter may monitor mentions of the user on certain subject sites, or across many websites, and may additionally monitor whether such mentions are positive or negative, i.e. may metricize such mentions as discussed hereinabove with respect to FIGS. 1 and 2.

The player illustrated in FIG. 8 plays for a team in New Orleans, La., and thus, it would not be surprising that the media rating, and/or metrics, of the player would be higher in New Orleans than in the rest of the United States. This is illustrated in FIG. 9. Further, the metrics may track chatter about a subject talent over time, as illustrated. The metrics provided may vary based on the flash enhancement selected to be provided. For example, a small sized flash overlay may provide simply a local and national on-line ranking for a selected talent. However, a medium overlay may additionally include a graph of a national and local ranking of the talent for a particular time period, such as over the proceeding three months. Finally, for large sized overlays, mouse over effects may be provided, such as showing specific ratings at given points on a ratings graph.

Figure 10:
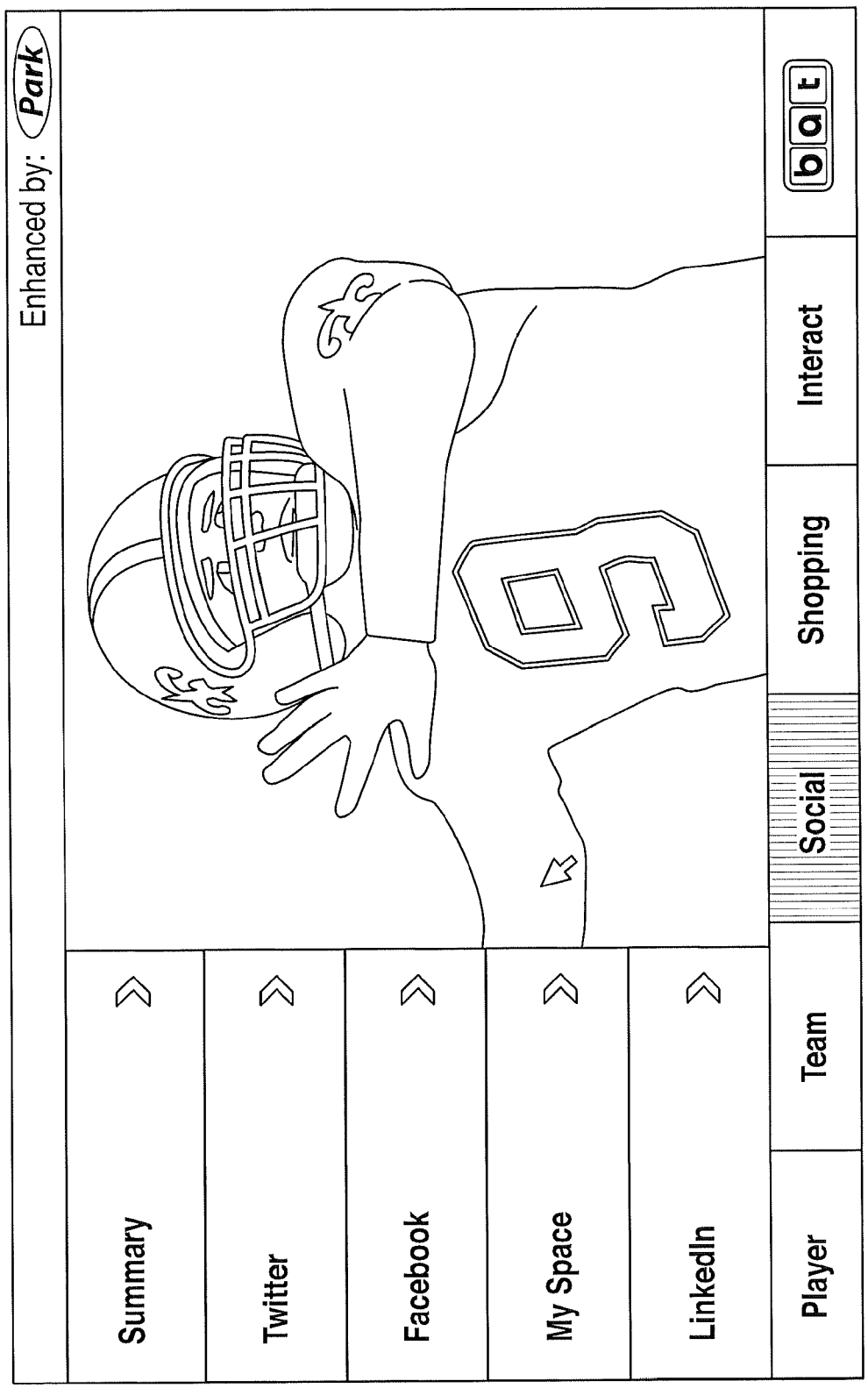
FIG. 10 is an illustration of an enhancement widget in accordance with the present invention.
Figure 11:
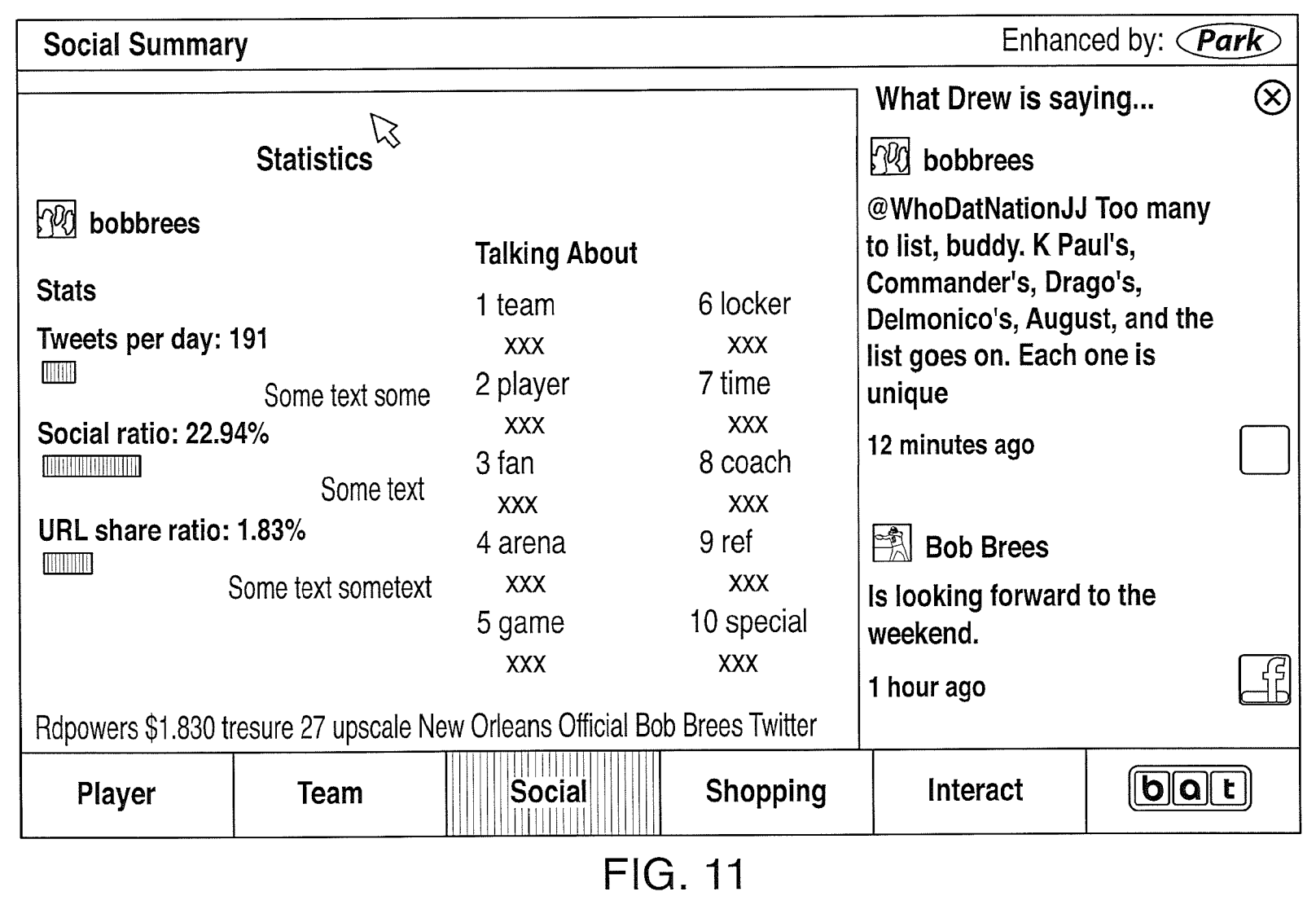

FIG. 10 illustrates a selection, or mouse over, of a social tab in the flash enhancement. Selection of the social tab may provide, for example, a series of aspects related to socializations of the player. For example, social network sites provided by or for the player may be accessible, as may be mentions associated with particular social networks about the player. Further, for example, recent posts on a social site about a talent featured in the editorial image may be provided, such as an association with a logo or link regarding the subject social network site. Additionally and alternatively, a summary of that talent on a social network site, such as a profile icon and/or summary of a profile of the subject talent, may be provided from the social network site. FIG. 11 illustrates an exemplary social summary with regard to the subject of the editorial image. As illustrated, social interactions of the talent may be tracked, and additionally statistics regarding mentions of the talent and the like may be provided.

Figure 12:
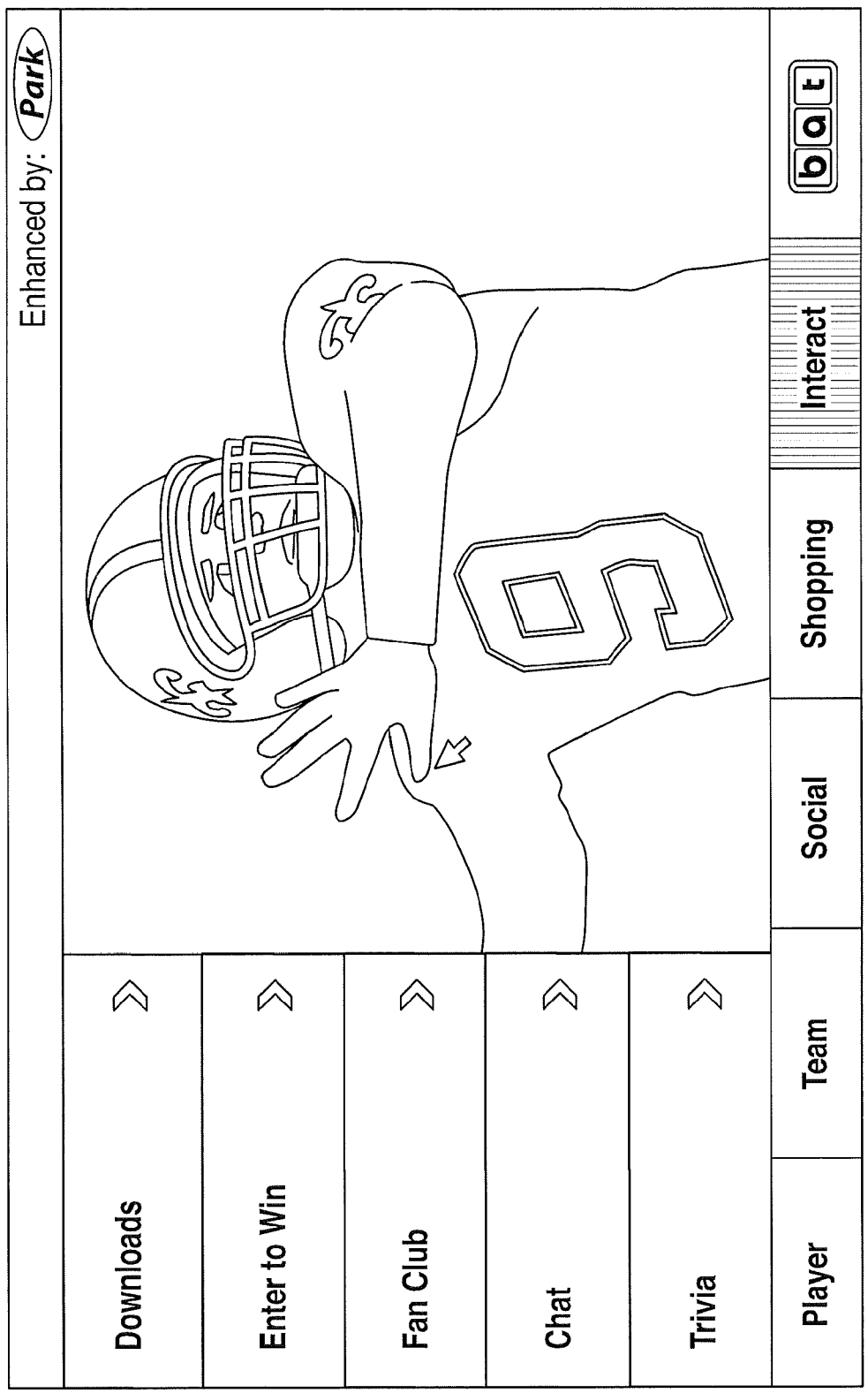
FIG. 12 is an illustration of an enhancement widget in accordance with the present invention.
Figure 13:
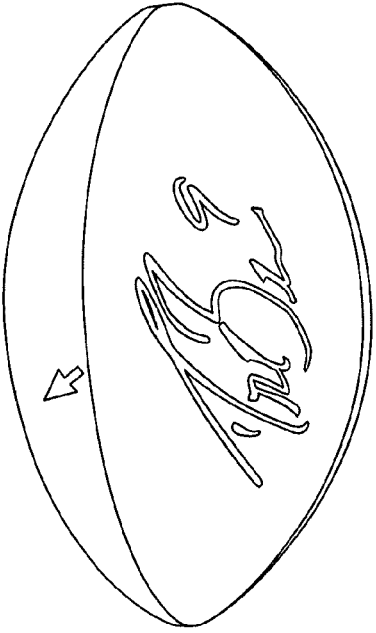
FIG. 13 is an illustration of an enhancement widget in accordance with the present invention.

FIG. 12 illustrates a selection and/or mouse over by a user of the interaction tab of the flash enhancement. The interaction tab may provide a plurality of interactions related to the subject talent of the editorial image, such as downloads related to the talent, sweepstakes related to the talent, fan clubs of the talent, chat with or about the talent, trivia related to the talent or an entity associated with the talent, or the like. For example, as illustrated in FIG. 13, a user may elect to enter a contest or sweepstakes associated with the subject talent. Further, as illustrated in FIG. 13 and as referenced hereinabove with each aspect of the flash enhancement overlay, portions of the flash enhancement provided may be transparent or translucent, such as in order to allow continuous presence as background of the original editorial image.

Figure 14:
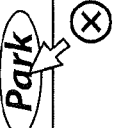
FIG. 14 is an illustration of an enhancement widget in accordance with the present invention.

As illustrated in FIG. 14, a sponsor may be provided for the flash enhancement. The sponsor may be selectable by a user, at which time an advertisement associated with the sponsor, and/or featuring the subject talent of the advertisement, may be provided to the user. Additionally and alternatively, a banner ad may be provided within, or associated with, the flash enhancement widget. In a preferred embodiment and in order to avoid conflicting advertisements, it may be necessary that, when an advertisement or banner advertisement is displayed in accordance with the flash enhancement widget, underlying advertisements and/or images may, contrary to that discussed above, not be visible to the user.

In an exemplary flow of the present invention, when a user on a web page places a cursor over a subject of interest in a particular article, the mention may be formatted as an enhanced flash media widget, such as wherein the mouse-over causes execution of widgetized code to provide a widget specifically designed for association with a reference to the subject of interest. Such a widget may provide additional information regarding the subject of interest, advertising endorsed by or otherwise associated with the subject of interest, desirable and/or free content, content from and/or stored in the vault discussed hereinabove, or any combination thereof, for example. Thereby, revenue gained through the provision of the subject widget, such as from click-throughs on advertising provided in association with the widget, may be shared between the provider of the widget and the site provider that allowed placement of the enhanced media, for example.

More specifically, the enhanced media may link to a particular item, and/or may provide access to different optional items, such as by provision of tabs in association with the widget provided correspondent to the mouse over. Advertising and other enhanced content may be provided from inventory in the vault. Thereby, revenue sharing between one or more of the advertising entity, the subject of interest, and the site provider may be made available through the use of the present invention.

Those skilled in the art will appreciate, in light of the disclosure herein, that the present invention is thus highly useful to all parties in the aforementioned widget transaction. For example, the advertiser can obtain new advertising inventory by placement of the enhanced media. By way of further example, the site provider may incur additional rich media that may be placed on the site without cost to the site provider, and that, in fact, may provide additional revenue to the site provider. Such rich media, due to the use of a widget in the present invention, may include the widgetization of desirable content, such as the flipping of Getty images like trading cards, with statistical information on the back of trading card, for example. Finally, the present invention proves useful to the subject of interest in the enhanced media, particularly in embodiments wherein an advertisement for which the subject of interest is an endorser is provided. From the provision of the endorsed advertisement, the subject of interest generates revenue when a user acts on the advertisement.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention.

What is claimed is:

1. A computer-implemented method of enhancing content on a web page being viewed by a user, comprising:

receiving, at a server computer from a user device over a data communication network, a request for a webpage to be viewed;

obtaining from a content producer information of subject matter included in the requested web page;

obtaining user-centric information from the user device including a user device type and user preferences;

identifying by the server computer a set of available applications able to operate on elements of the web page using data from third parties;

obtaining select third party data upon execution of a select one of the applications;

refraining from obtaining information that may be embedded in digital objects included in the web page;

providing to the user device a server-side interpreted programming language script operative to:

locate an enhanceable image on the webpage;

provide for the setup on the webpage of a widget associated with the enhanceable image;

overlay on the enhanceable image a widget presenting graphical content related to at least one subject of the enhanceable image;

select a display mode for the overlay and sizing the overlay in accordance with the selected mode, wherein the mode is one of a small mode of 300 ×250 pixels, a medium mode of 400 ×300 pixels, and a large mode of 600 ×400 pixels, wherein the mode selected approximates the size of the underlying image; and provide a drop down list containing the at least one subject for a user to select one of the subject(s), wherein the subject placed at the top of the dropdown list is based on the selections of a plurality of other users;

searching for digital content associated with a talent selected by the user, responsive to a request received from an application running on the user device selected by the user;

returning digital content obtained responsive to the request from the user device, including content from a computer-readable data storage device (vault) having resident therein digital content associated with a plurality of talents;

formatting, by a computing processor, the returned content for delivery to the user device; and delivering the formatted content to the user device over the data communication network.

2. The method of claim 1, further comprising:

automatically providing criteria to a provider of the application to authorize use of the application and, upon successful authorization, enabling the application to access the formatted content.

3. The method of claim 2, wherein the criteria comprise terms and conditions.

4. The method of claim 2, wherein the criteria comprise obtaining express electronic permission.

5. The method of claim 2, wherein the criteria comprise a negotiation, and wherein the successful authorization comprises a completion of the negotiation.

6. The method of claim 2, wherein the criteria comprise a payment.

7. The method of claim 1, wherein the select application was provided by the server for execution on the user device.

8. The method of claim 7, wherein the application includes an advertisement.

* * * * *